United States Patent
Ho

(10) Patent No.: US 7,348,758 B2
(45) Date of Patent: Mar. 25, 2008

(54) AUDIBLE NOISE REDUCTION FOR SINGLE CURRENT SHUNT PLATFORM

(75) Inventor: Eddy Ying Yin Ho, Torrance, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 11/552,758

(22) Filed: Oct. 25, 2006

(65) Prior Publication Data

US 2007/0090785 A1 Apr. 26, 2007

Related U.S. Application Data

(60) Provisional application No. 60/730,342, filed on Oct. 26, 2005.

(51) Int. Cl.
*H02P 23/00* (2006.01)
(52) U.S. Cl. .................. 318/811; 318/599; 318/812; 318/801; 363/41
(58) Field of Classification Search ............. 318/599, 318/811, 812, 254, 138, 439, 801; 363/41, 363/98
See application file for complete search history.

(56) References Cited

U.S. PATENT DOCUMENTS

| | | |
|---|---|---|
| 4,847,743 A | 7/1989 | Kamiyama |
| 5,182,701 A | 1/1993 | Mochikawa et al. |

(Continued)

OTHER PUBLICATIONS

Digital Signal Processing Solutions, Application Report SPRA524, "Space-Vector PWM With TMS320C24x/F24x Using Hardware and Software Determined Switching Patterns" Mar. 1999, pp. 2-44.

(Continued)

*Primary Examiner*—Rina I Duda
(74) *Attorney, Agent, or Firm*—Ostrolenk, Faber, Gerb & Soffen, LLP

(57) ABSTRACT

A method and system for reducing audible motor noise in a system for reconstructing motor phase current from a DC bus current comprising current pulses on a DC bus in a PWM inverter motor drive system having a PWM cycle, and for controlling the motor, which forms a command voltage vector according to a space vector modulation arrangement for controlling the motor; measures the DC bus current on the DC bus supplying power to the inverter to reconstruct said motor phase current; and determines when the command voltage vector results in an inverter switching state that prevents the measuring of the DC bus current from accurately indicating motor phase current. During said inverter switching state, a current sampling scheduler applies a minimum pulse width constraint to said current pulses in said DC bus current to improve reconstruction of said motor phase current based on said DC bus current; and reduces the application of said minimum pulse width constraint to less than once per PWM cycle imposed by the PWM inverter motor drive system, thereby allowing motor phase current reconstruction with reduced audible motor noise. The current sampling scheduler synchronously samples said measured motor phase current to reduce errors in said measured motor phase current caused by said reduction of said minimum pulse constraint; reduces a bandwidth of said motor controller during said inverter switching state; and is adjustable in response to motor speed for setting the number of said minimum pulse width constraints per PWM cycle.

13 Claims, 4 Drawing Sheets

U.S. PATENT DOCUMENTS

| | | | |
|---|---|---|---|
| 5,280,419 A | 1/1994 | Amler | |
| 5,285,145 A | 2/1994 | Minowa et al. | |
| 5,552,977 A * | 9/1996 | Xu et al. | 363/41 |
| 5,565,752 A | 10/1996 | Jansen et al. | |
| 5,574,636 A | 11/1996 | Lee et al. | |
| 5,614,803 A | 3/1997 | Morioka et al. | |
| 5,852,551 A | 12/1998 | Lee | |
| 5,942,876 A | 8/1999 | Maekawa | |
| 6,005,783 A | 12/1999 | Xue et al. | |
| 6,512,341 B2 * | 1/2003 | Matsushiro et al. | 318/254 |
| 6,560,130 B2 * | 5/2003 | Oba et al. | 363/97 |
| 6,590,794 B1 | 7/2003 | Carter | |
| 6,653,812 B1 | 11/2003 | Huo et al. | |
| 6,751,105 B2 | 6/2004 | Yamanaka et al. | |
| 6,924,618 B2 | 8/2005 | Matsushiro et al. | |
| 7,102,327 B2 | 9/2006 | Ho | |
| 2001/0008371 A1 | 7/2001 | Norrkniivila et al. | |

OTHER PUBLICATIONS

Single Current Sensor Technique in the DC-link of Three-phase PWM-VS Inverters-A Review and the Ultimate Solution—Blaabjerg et al., 1996 IEEE, pp. 1192-1202.

Comparison of Single-Sensor Current Control in the DC Link For Three-Phase Voltage-Source PWM Converters—IEEE Transactions on Industrial Electronics, vol. 48, No. 3, Jun. 2001, pp. 491-505.

Interleaved PWM with Discontinuous Space-Vector Modulation—IEEE Transactions on Power Electronics, vol. 14, No. 5, Sep. 1999 pp. 906-917.

3 Space Vector Modulation For Four-Leg Voltage Source Inverters—pp. 27-51.

Motor Insulation Voltage Stresses Under PWM Inverter Operation—GAMBICA/REMa Technical Report, Second Edition No. 1 pp. i-16.

Ho et al., U.S. Appl. No. 10/402,107, filed Mar. 27, 2003, pending.

* cited by examiner

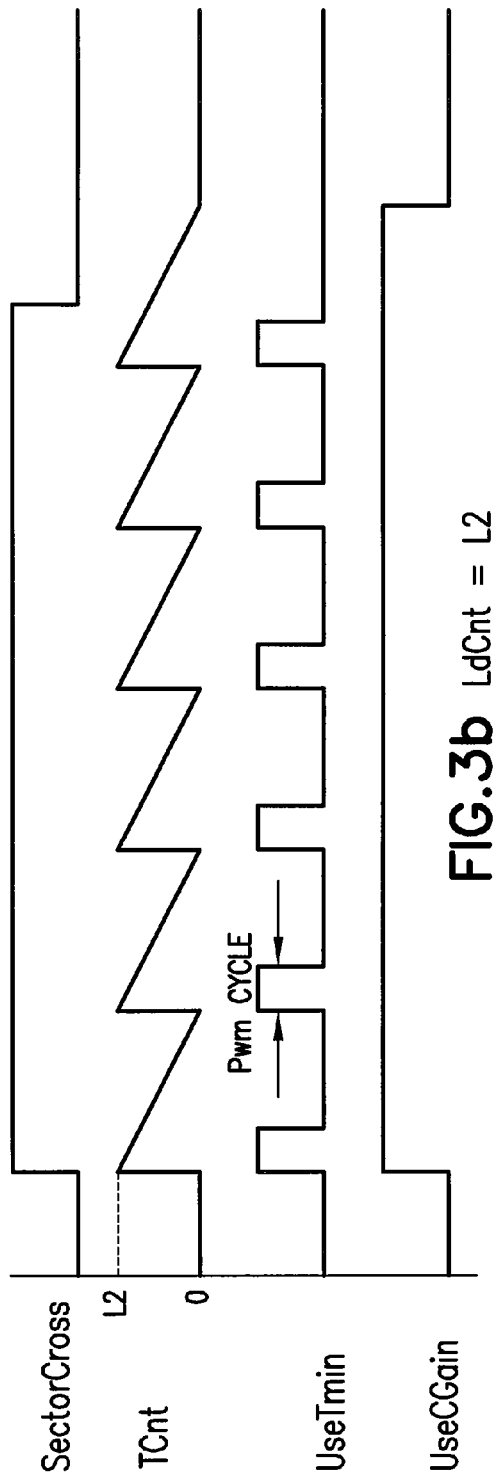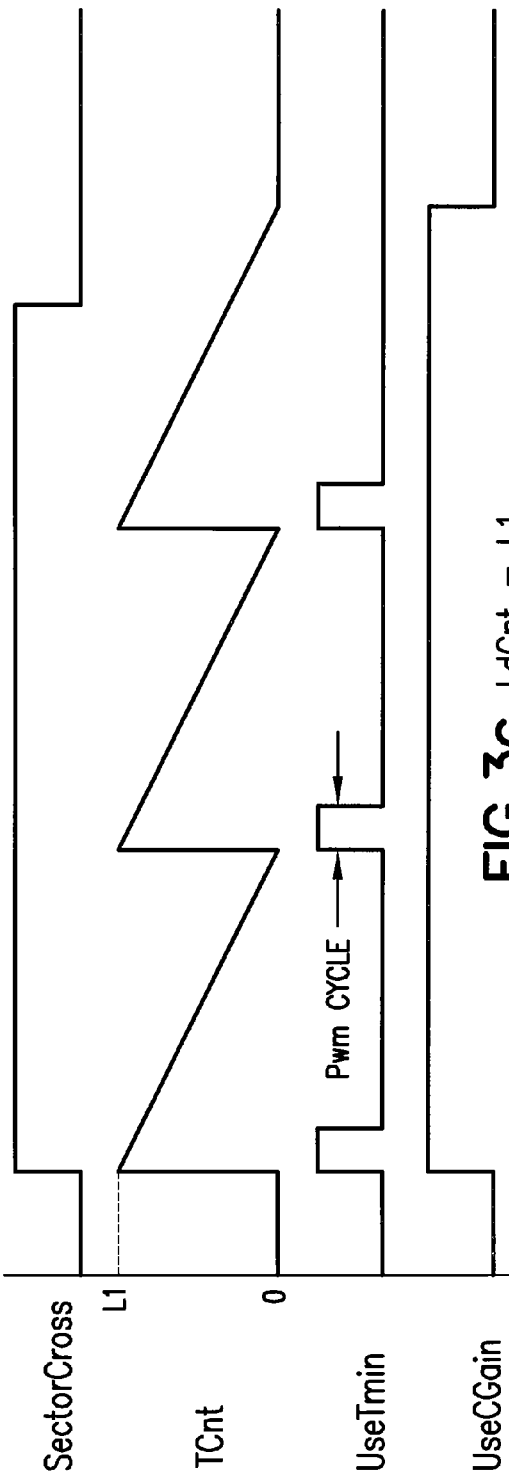

AUDIBLE NOISE REDUCTION FOR SINGLE CURRENT SHUNT PLATFORM

CROSS REFERENCE TO RELATED APPLICATIONS

This application is based upon and claims priority of U.S. Provisional Ser. No. 60/730,342 filed Oct. 26, 2005 (IR-3076 PROV), incorporated by reference.

This application is related to U.S. Pat. No. 7,102,327 issued Sep. 5, 2006 (IR-2465 CIP) and its parent, U.S. Ser. No. 10/402,107 filed Mar. 27, 2003 (IR-2160), pending, both incorporated by reference.

BACKGROUND OF THE INVENTION

1. Field of the Invention

The present invention relates to an algorithm and system that reduces the audible motor noise induced by the single current shunt feedback topology of conventional PWM inverter drives.

2. Related Art

FIG. 1a shows the Space Vector Plane of a 2-level inverter. In order to observe dc link current and allow reliable current sampling, a minimum pulse width constraint (FIG. 1b) has to be imposed whenever the voltage vector enters the shaded regions (Sector Crossings) in FIG. 1a. Examples of these techniques are described in the above-mentioned U.S. Pat. No. 7,102,327; in Ser. No. 10/402,107; and in Blaabjerg et al., "Single Current Sensor Technique in the DC-link of Three-phase PWM-VS Inverters-A Review and the Ultimate Solution," IEEE, pages 1192-1202 (1996), incorporated by reference and therefore will not be described further herein.

In a 2-level inverter system, the instantaneous current waveform in the dc link is composed of current pulses. The current pulse width is reduced as the modulation index (motor speed) decreases; up to a point where the minimum pulse width constraint (hardware dependent, typically 0.5 to 2 usec) has to be imposed in order to acquire reliable current feedback data. As a consequence of applying this minimum pulse width constraint, the current harmonics increase. The audible motor noise spectrum also increases and spreads out, especially at low motor speeds (say less than 20 percent of rated speed), where the voltage vector of FIG. 1a spends a longer duration in the shaded area. This leads to unacceptable noise performance in some applications.

SUMMARY OF THE INVENTION

The present invention solves the above-mentioned problem by providing an algorithm and system that reduce the audible motor noise induced by using the single current shunt feedback topology of conventional PWM inverter drives.

The audible motor noise reduction technique involves the adaptive reduction of the total number of minimum pulse width constraints applied inside the shaded regions of FIG. 1a. This is done by introducing a new schedule for minimum pulse insertion. When the voltage vector enters a sector-crossing area, the current feedback sampling rate, and motor controller bandwidth, are modified in accordance with the minimum pulse elimination. As soon as the voltage vector exits the shaded regions, the nominal feedback sampling rate and motor controller bandwidth are resumed.

In addition, the new schedule for minimum pulse insertion is adaptive to motor speed. This is done to maximize the achievable controller bandwidth. In this adaptive feedback sampling regime, the PWM switching frequency is unaltered and hence the characteristic of PWM induced harmonics is preserved.

Other features and advantages of the present invention will become apparent from the following description of embodiments of the invention which refers to the accompanying drawings.

BRIEF DESCRIPTION OF THE DRAWINGS

FIGS. 3(b) and 3(c) are timing diagrams showing a reduction of the minimum pulse width constraint in the illustrated example.

DETAILED DESCRIPTION OF AN EMBODIMENT OF THE INVENTION

Figure 2:
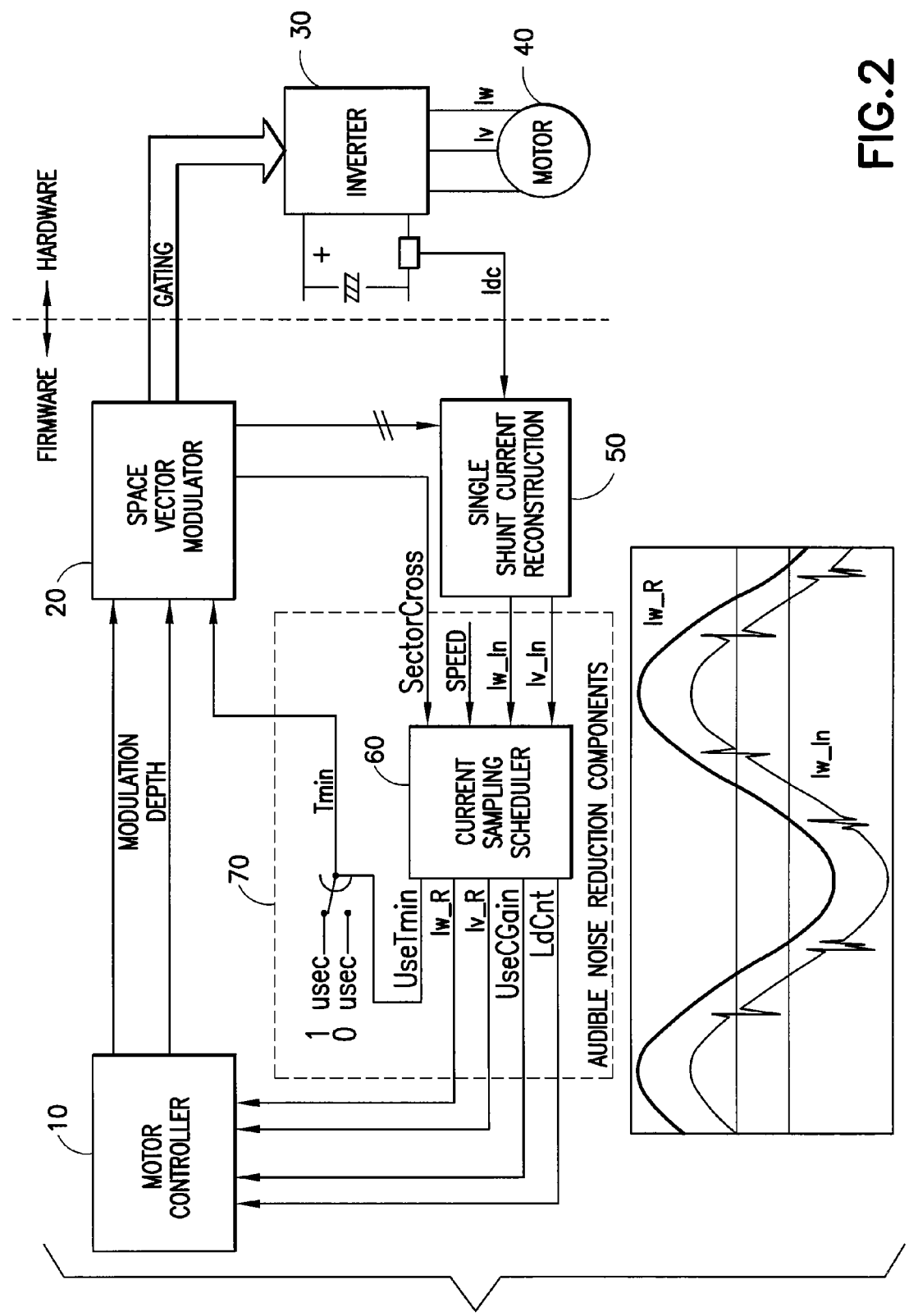
FIG. 2 is a block diagram of an inverter drive system to which the invention has been applied.

FIG. 2 shows a sensorless inverter drive system comprising a motor controller (speed and current control) 10, a space vector PWM modulator 20, a 2-level inverter 30 and a motor 40. The motor currents (Iw_In, Iv_In) are reconstructed at block 50 from the single shunt feedback current Idc. The reconstructed currents (Iw_In, Iv_In) have conventionally been fed directly to the motor controller. However, in FIG. 2, these motor currents are processed by a current sampling scheduler 60 before entering the motor controller. The audible noise reduction components are shown inside the dotted box 70 of FIG. 2.

Figure 1A:
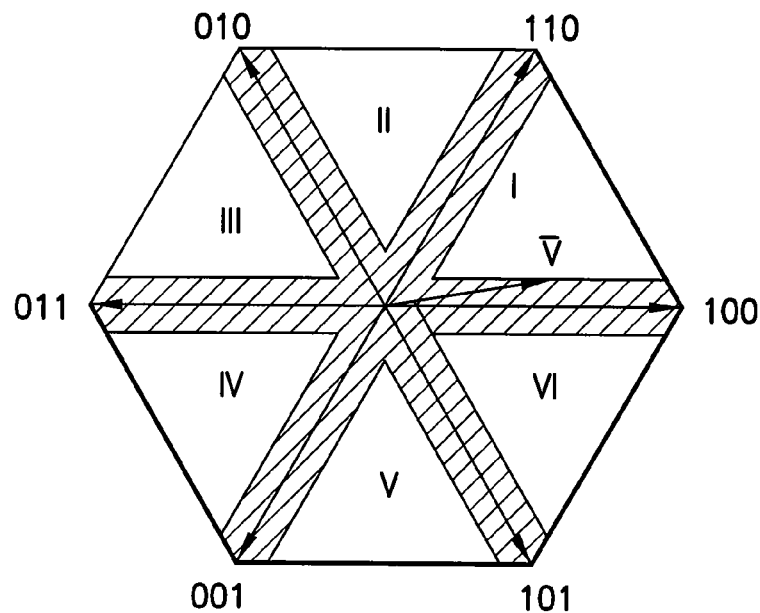
FIG. 1a is a voltage space vector plane diagram of a 2-level inverter.
Figure 1B:
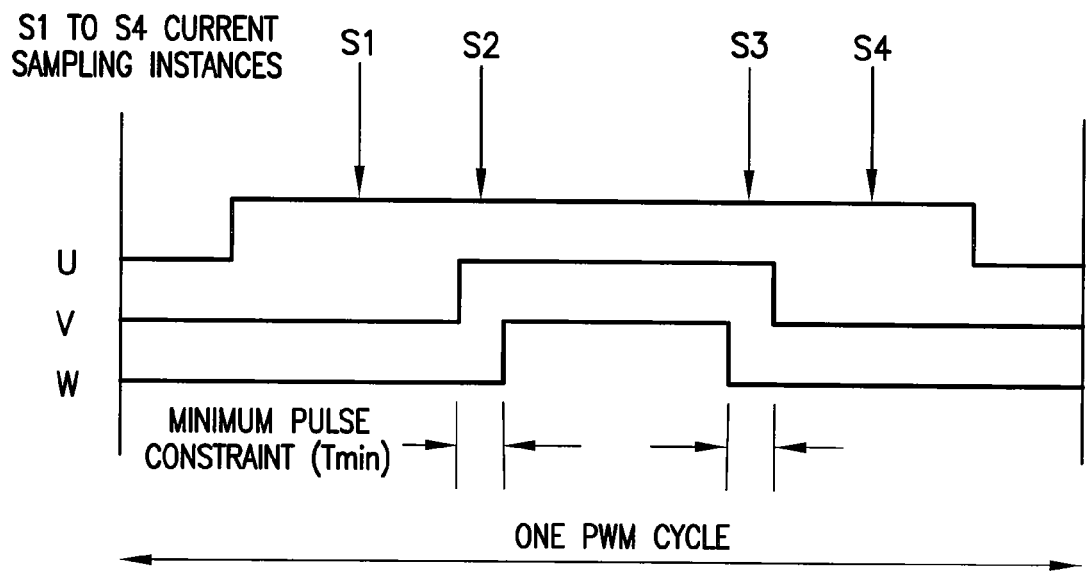
FIG. 1b is a timing diagram illustrating application of a minimum pulse width constraint.

During sector crossing (FIG. 1 shaded region), the single current shunt reconstruction algorithm normally imposes a minimum pulse width clamping for each PWM cycle. The current sampling scheduler (FIG. 2) reduces the amount of minimum pulse clamping occurrences by forcing (UseTmin) a minimum pulse to be applied at a prescribed rate which is slower than at every PWM cycle. Due to the reduction of minimum pulse clamping, the dc link current cannot be observed and the sampled currents (Iw_In, Iv_In, the output of the single shunt current reconstruction) exhibit errors (FIG. 2, current spikes in bottom trace, Iw_In). These current spikes are rejected (FIG. 2, top trace, Iw_R) by the current sampling scheduler 60 by synchronous sampling of the input currents (Iw_In, Iv_In). The inverter PWM frequency is unchanged during the entire process of audible noise reduction.

Figure 3A:
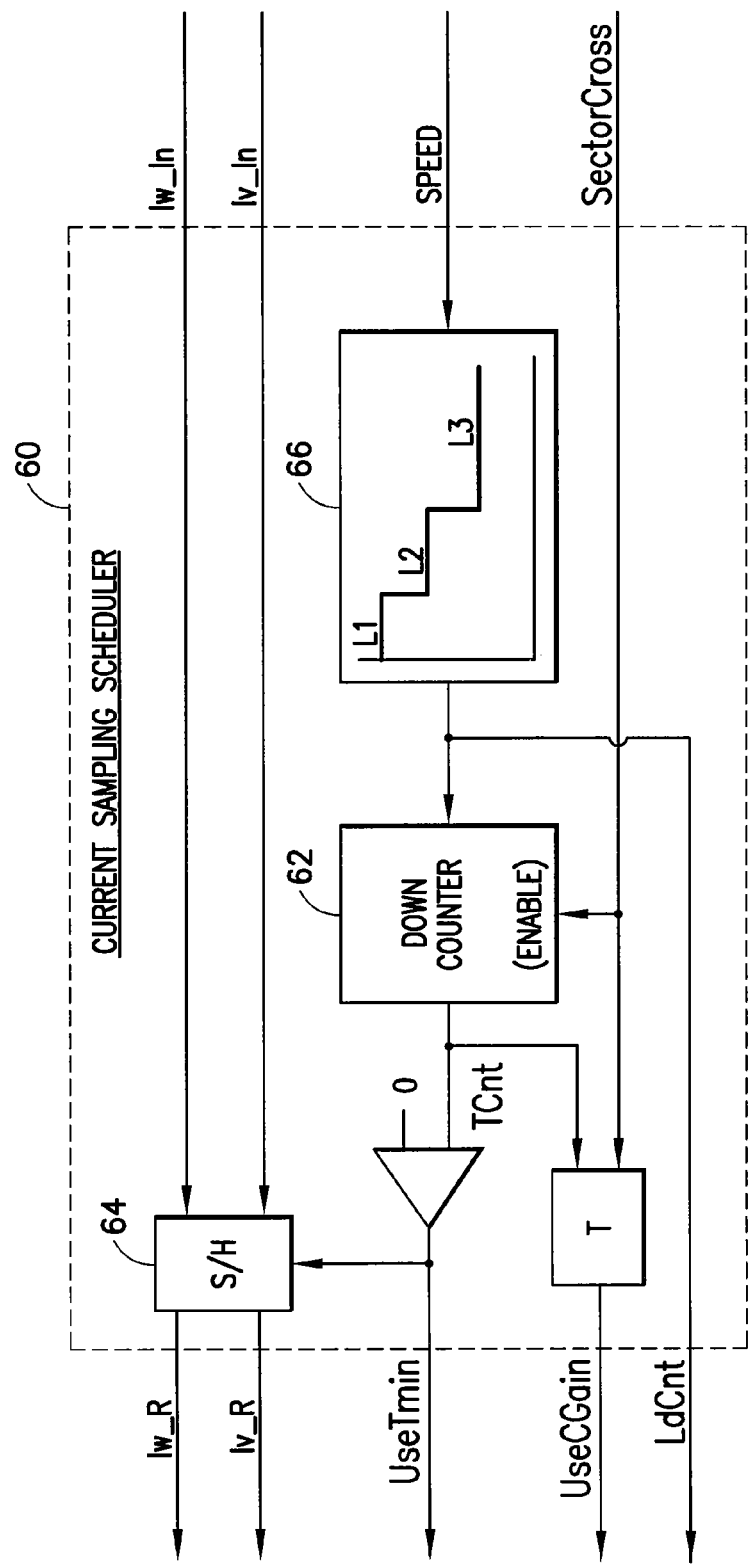
FIG. 3(a) is a block diagram of the current sampling scheduler in FIG. 2.

FIG. 3 shows details of reduction of minimum pulse clamping occurrences and synchronous sampling in the current sampling scheduler 60. Upon detection (by the PWM space vector modulator 20) of a sector crossing region, a control signal Sector Cross (FIG. 2) causes the amount of minimum pulse clamping to be reduced by a down counter 62 as shown in FIG. 3(a). The value (LdCnt) loaded in this counter from an adaptation function 66 determines the minimum pulse clamping rate.

FIG. 3(b) illustrates an example in which a minimum pulse is imposed once every 4 PWM cycles and the motor currents (Iw_In, Iv_In) are sampled and held by a S/H circuit 64 (Iw_R, Iv_R) whenever the minimum pulse is imposed.

Since the motor speed is relatively slow, the current error introduced due to this holding is small.

FIG. 3(c) illustrates imposing of a minimum pulse once every 8 PWM cycles.

As the number of PWM cycles increases (reduced sampling rate), the motor controller bandwidth is reduced accordingly. Signals UseCGain and LdCnt provide the motor controller information for bandwidth (gain adjustment) correction. When UseCGain is set high, the controller bandwidth will be reduced, based on the value of LdCnt.

When motor speed increases (modulation increases), the average time spent in the sector crossing regions reduces. Therefore the preload counter value (LdCnt) can be reduced (L1, L2, L3) in order to resume higher controller bandwidth and current sampling rate during sector crossing. In addition, the number of preload counter values (L1, L2 and L3) can be increased to provide more graduated changes in sampling rate, so that the adaptation function 66 illustrated in FIG. 3(a) can approach a curve.

Definition of Parameters

Iw_In—reconstructed (from single current shunt) w-phase current

Iv_In—reconstructed (from single current shunt) v-phase current

Iv—actual v-phase motor current

Iw—actual w-phase motor current

Iw_R—Sychronously sampled w-phase current

Iv_R—Sychronously sampled v-phase current

Idc—dc link current

LdCnt—current sampling scheduler preload counter value

SectorCross—status flag to signal voltage vector is inside sector crossing area

Tmin—minimum pulse duration (secs)

UseCGain—controller gain change command flag

UseTmin—minimum pulse insertion command flag

Performance tests using the IRMCS311 v2.0 platform driving an EBM fan and Samsung Washer have verified the noise reduction capability of the proposed scheme.

Although the present invention has been described in relation to particular embodiments thereof, many other variations and modifications and other uses will become apparent to those skilled in the art. Therefore, the present invention is not limited by the specific disclosure herein.

What is claimed is:

1. A method for reducing audible motor noise in a system for reconstructing motor phase current from a DC bus current comprising current pulses on a DC bus in a PWM inverter motor drive system having a PWM cycle, and for controlling the motor, comprising:
    forming a command voltage vector according to a space vector modulation arrangement for controlling the motor;
    measuring the DC bus current on the DC bus supplying power to the inverter to reconstruct said motor phase current;
    determining a sector crossing region when the command voltage vector results in an inverter switching state that prevents the measuring of the DC bus current from accurately indicating motor phase current;
    during said inverter switching state, applying a minimum pulse width constraint to said current pulses in said DC bus current to improve reconstruction of said motor phase current based on said DC bus current;
    applying said minimum pulse width constraint less than once per PWM cycle during said sector crossing region, thereby allowing motor phase current reconstruction with reduced audible motor noise.

2. The method according to claim 1, further comprising synchronously sampling said measured motor phase current to reject errors in said measured motor phase current caused by said reduction of said minimum pulse constraint during sector crossing.

3. The method according to claim 2, further comprising reducing a bandwidth of said motor controller according to said sampling reduction in the sector crossing region.

4. The method according to claim 1, further comprising reducing a bandwidth of said motor controller according to said sampling reduction in the sector crossing region.

5. The method according to claim 1, wherein said current sampling scheduler is adjusted in response to motor speed for reducing the number of said minimum pulse width applications in the sector crossing region.

6. The method according to claim 5, wherein in the reducing step, the reduction of said minimum pulse width applications is greater at slower motor speeds than at higher motor speeds.

7. A space vector PWM motor drive system having a noise reduction scheduler operated in accordance with the method of claim 1.

8. A PWM inverter motor drive system for controlling a motor with audible motor noise reduction, comprising:
    a motor controller having a PWM cycle and forming a command voltage vector according to a space vector modulation arrangement to be supplied to the motor;
    a unit for measuring a DC bus current comprising current pulses on a DC bus supplying power to the inverter and reconstructing a motor phase current therefrom:
    said motor controller determining a sector crossing region when the command voltage vector results in an inverter switching state that prevents the measuring of the DC bus current from accurately indicating motor phase current;
    during said inverter switching state, a current sampling scheduler applying a minimum pulse width constraint to said current pulses in said DC bus current to improve reconstruction of said motor phase current based on said DC bus current;
    said current sampling scheduler applying said minimum pulse width constraint less than once per PWM cycle during sector crossing, thereby allowing motor phase current reconstruction with reduced audible motor noise.

9. The system according to claim 8, wherein said current sampling scheduler synchronously samples said measured motor phase current to reject errors in said measured motor phase current caused by said reduction of said minimum pulse constraint during sector crossing.

10. The system according to claim 9, wherein said current sampling scheduler reduces a bandwidth of said motor controller in accordance with said sampling reduction in said sector crossing region.

11. The system according to claim 8, wherein said current sampling scheduler reduces a bandwidth of said motor controller in accordance with said sampling reduction in said sector crossing region.

12. The system according to claim 8, wherein said current sampling scheduler is adjustable in response to motor speed for reducing the number of said minimum pulse width applications in the sector crossing region.

13. The system according to claim 12, wherein the reduction of said minimum pulse width applications is greater at slower motor speeds than at higher motor speeds.

* * * * *